(No Model.)
E. B. BARKER.
PHOTOGRAPHIC PLATE OR SHEET HOLDER.
No. 315,219. Patented Apr. 7, 1885.
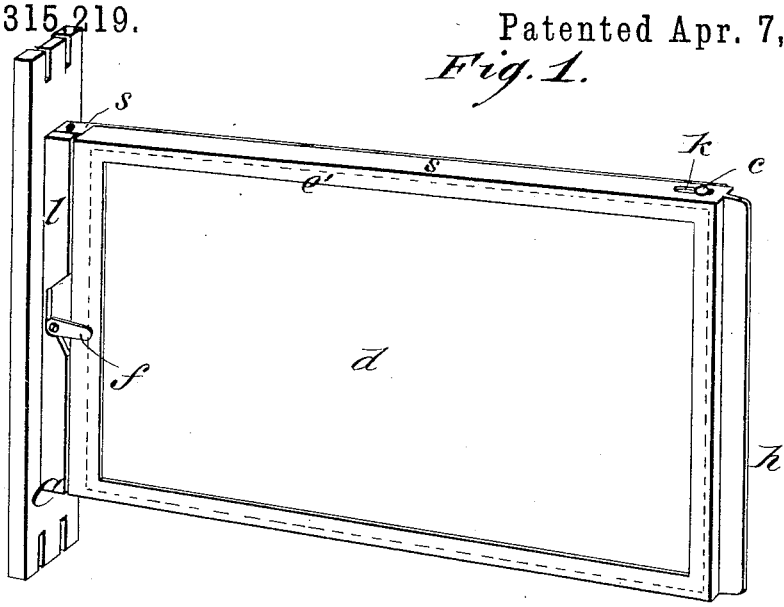
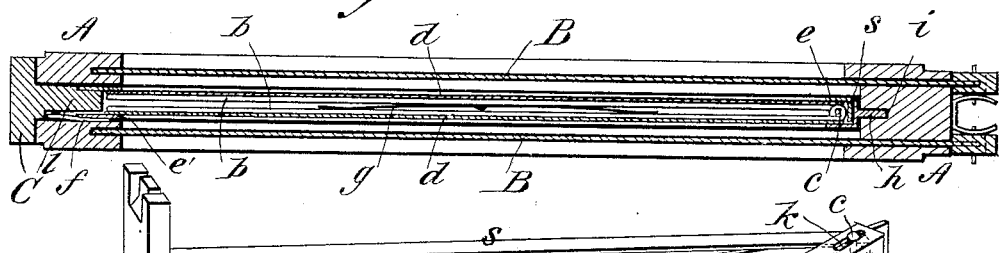
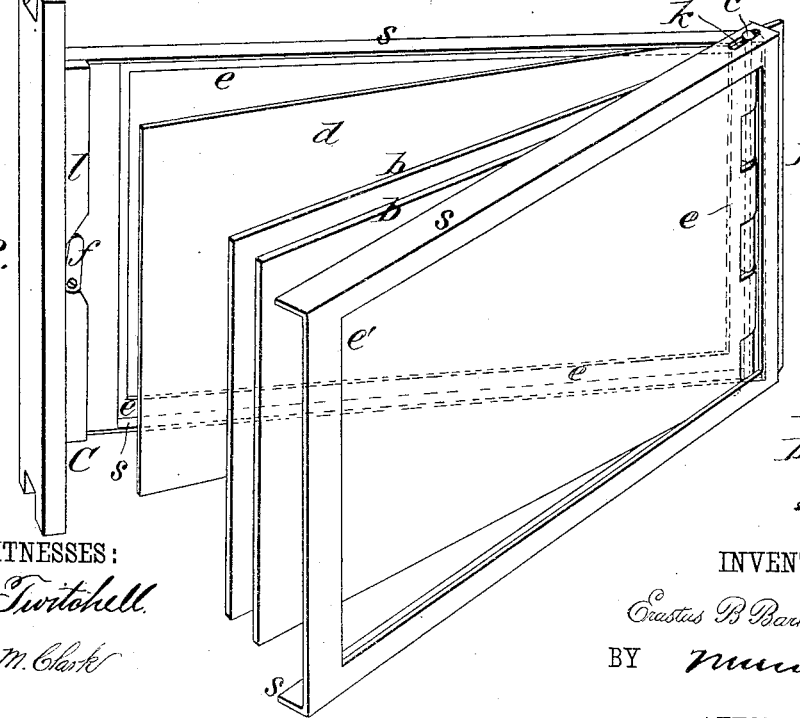
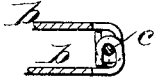
WITNESSES:
Dorr Twitchell
Edward M. Clark
INVENTOR:
Erastus B. Barker
BY
ATTORNEYS.

UNITED STATES PATENT OFFICE.

ERASTUS B. BARKER, OF NEW YORK, N. Y., ASSIGNOR TO E. & H. T. ANTHONY & CO., OF SAME PLACE.

PHOTOGRAPHIC PLATE OR SHEET HOLDER.

SPECIFICATION forming part of Letters Patent No. 315,219, dated April 7, 1885.

Application filed November 18, 1884. (No model.)

*To all whom it may concern:*

Be it known that I, ERASTUS B. BARKER, of the city, county, and State of New York, have invented certain new and useful Improvements in Photographic Plate or Sheet Holders, of which the following is a full, clear, and exact description.

This invention relates to photographic plate-holders more particularly designed for holding sensitized sheets of paper or other flexible material, and for which the ordinary plate-holders used in taking glass negatives are not adapted.

The invention consists in a combination, with the septum of the holder, of an open hinged or swinging frame constructed to clamp the marginal portions of the sensitive sheet on or against the septum.

It also consists in special constructions of the septum and sheet clamping frame or frames, and in certain combinations of the same and other parts, whereby a superior sensitized plate or sheet holder, especially when of double construction and using a sliding septum, is produced, substantially as hereinafter described and claimed.

Reference is to be had to the accompanying drawings, forming a part of this specification, in which similar letters of reference indicate corresponding parts in all the figures.

Figure 1 represents a view in perspective of a double sliding septum-plate or sheet holder embodying my invention, when said holder is closed upon the sheets, but removed from the shutter case or frame of the holder. Fig. 2 is a horizontal or longitudinally transverse section of the same when inclosed within the shutter case or frame; and Fig. 3, a view in perspective of the double-sliding septum-plate or sheet-holder when thrown open and with one of the sensitive sheets removed. Fig. 4 is a detail view showing a pivoted or jointed connection of the two boards or face-plates of the hollow or divided septum.

A indicates the shutter case or frame of a double plate or sheet holder, and B B its sliding shutters, both of the ordinary construction.

C is the septum or sheet-holder proper, arranged to slide within and out of the frame or case A from the opposite end to that at or from which the shutters are manipulated. This septum is here shown as being composed, mainly, of two separated faces or center boards, $b\,b$, pivoted together at $c$ at their inner ends, and serving to carry flexible sensitized sheets $d\,d$, of paper or other material, on or against their outer faces and between said faces and two outer marginal frames, $e\,e'$, hinged together, as at $c$, and it may be by the same pin which pivots or hinges the face-boards $b\,b$ together. These pivoted open frames $e\,e'$, which admit of the ready entry and removal of the sensitized sheets $d\,d$, serve as marginal binders or clamps to hold said flexible sheet straight and in good focusing position, a fastening, $f$, of any suitable kind on the septum head or stop $l$ holding the frames closed.

To further secure a good and level clamping hold of the flexible sheets $d\,d$ at their edges, the septum is made hollow, or divided, as described, into two separated boards, $d\,d$, with one or more springs, $g$, interposed between them, to force them apart and the sheets firmly against the marginal holding-frames $e\,e'$; and to give said boards a parallel action their hinge-joint $c$ is constructed to admit of transverse play, as shown in Fig. 4.

The pivoted frames $e\,e'$ are constructed with marginal flanges or lips $s$, whereby said frames will fold one within the other with the septum-boards between them.

Although the two frames $e\,e'$ are pivoted together at $c$, only the outer or one of them, $e'$, is here shown as swinging or working along with the boards $b\,b$ to get at or place either or both sheets $d\,d$, the other clamping-frame, $e$, being rigidly secured at its outer end to the septum head or stop $l$, and serving to carry both the outer pivoted frames $e$ and septum-boards $b\,b$. The outer frame, $e'$, is constructed at its inner end with a slot, $k$, both above and below, receiving the pin of the pivot $c$ within it, whereby said frame is made to slide longitudinally up on the other frame, $e$, and the septum, to facilitate the opening and closing of the several parts and the insertion and removal of the photographic sheets. If desired, however, instead of the divided boards $b\,b$, the septum might be made solid throughout its length, and the two marginal or open frames $e\ e'$, for clamping or holding the sensitized sheets, be hinged to open and close on and toward or from opposite sides of the septum, in which case said frames $e\ e'$, instead of being of flanged construction in transverse section, to overlap one another at their top, bottom, and rear end, as shown in the drawings, might be of a plain or flat construction, similar to the forward end piece of the swinging frame $e'$ in Fig. 3. Of course, when the plate-holder is a single one—that is, constructed to hold only a single sensitized sheet on the one side of the septum—but a single pivoted marginal or open clamping-frame on one side of the septum will be used. When, however, the plate-holder is a double one—that is, constructed to hold duplicate sensitized sheets on opposite sides of the septum—then I provide the septum at its inner or closing end with a thin fin, $h$, arranged to extend throughout its depth and to closely enter within a corresponding groove, $i$, in the shutter case or frame A of the holder, whereby, when exposing the sensitized sheet on the one side of the septum to take a negative, light is prevented from passing to the sensitized sheet on the other side of the septum, the fin $h$ forming a light and close divider, and serving much more effectually to prevent light from passing round it and through the groove in which it fits than is practicable by causing the inner end of the septum itself to fit within a groove of correspondingly larger dimensions than that required for the mere fin.

Having thus described my invention, I claim as new and desire to secure by Letters Patent—

1. In a photographic-plate holder, the combination, with the septum of the holder, of an open hinged or swinging frame constructed to clamp or hold the marginal portions of the sensitive sheet on or against the septum, substantially as specified.

2. A septum for a photographic-plate holder, made substantially as herein shown and described, consisting of pivoted boards, in combination with pivoted open frames constructed to clamp the marginal portions of the sensitized sheets on or against said boards, essentially as described.

3. The combination, with the septum-boards and the pivoted frames, of the separating spring or springs $g$, substantially as described, whereby the edges of the sensitized sheets will be firmly held between the septum-boards and the edges of the pivoted frames, as set forth.

4. The pivoted frames $e\ e'$, constructed with flanges or lips $s$, substantially as shown and described, whereby the frames will fold one within the other, with the septum-boards between, as set forth.

5. The outer frame, $e'$, constructed with a slot, $k$, as shown and described, whereby said frame is made to slide longitudinally upon the other frame and the septum, to facilitate the opening and closing of the several parts and the insertion and removal of the photographic sheets, as set forth.

6. The fastening $f$, in combination with the pivoted frame $e'$ and the septum head or stop $l$, as shown and described.

7. The combination, with the extremity of the frame $e'$, of the projecting fin $h$, as and for the purposes shown and described.

8. The frame $e$, fixedly secured to the septum head or stop $l$, and serving to carry both the outer pivoted frame and septum-boards, substantially as specified.

ERASTUS B. BARKER.

Witnesses:
 EDGAR TATE,
 EDWARD M. CLARK.